United States Patent [19]
Nabors

[11] Patent Number: 5,786,929
[45] Date of Patent: Jul. 28, 1998

[54] OPTICAL PARAMETRIC OSCILLATOR WITH DELAYED REPUMPING

[75] Inventor: C. David Nabors, Sunnyvale, Calif.

[73] Assignee: Coherent, Inc., Santa Clara, Calif.

[21] Appl. No.: 656,843

[22] Filed: Jun. 3, 1996

[51] Int. Cl.$^6$ ........................................... G02F 1/39
[52] U.S. Cl. ........................................... 359/330
[58] Field of Search .............................. 359/326–332

[56] References Cited

U.S. PATENT DOCUMENTS

| | | | |
|---|---|---|---|
| 3,824,717 | 7/1974 | Evtuhov et al. | 359/330 |
| 4,039,851 | 8/1977 | Jain et al. | 359/327 |
| 4,361,770 | 11/1982 | Rabinowitz et al. | 359/327 |
| 4,570,081 | 2/1986 | Baldwin | 359/327 |
| 5,463,485 | 10/1995 | Alfano et al. | 359/330 X |
| 5,504,763 | 4/1996 | Bischel et al. | 372/33 |

OTHER PUBLICATIONS

"Optical Parametric Oscillator Threshold and Linewidth Studies", Brosnan and Byer, IEEE Journal of Quantum Electronics, QE–15, No. 6 pp. 415–431, Jun. 1979.

*Primary Examiner*—John D. Lee

[57] ABSTRACT

An optical parametric oscillator (50) includes a resonator cavity (26) for laser light, and a gain medium (28) disposed in the resonant cavity for converting pump light to the laser light. The oscillator includes an optical arrangement for directing a pulse of the pump light pulse to make generally axially counterpropagating initial and return passes through the gain medium. The optical arrangement includes a pulse return reflector (37) for directing the pulse to make the return pass. The reflector is separated from the gain medium forming a delay line of length sufficient that the initial and return passes are separated in time by greater than about 0.5 FWHM of the pump light pulse. The reflector forms part of a relay imaging system (51) which causes the initial and return passes to propagate through substantially the same volume of gain medium.

21 Claims, 9 Drawing Sheets ns inversely with pump light pulse width. A means for producing effectively longer pump light pulses without increasing pump pulse intensity in the gain medium would thus have a significant beneficial effect on OPO device pump threshold, and on OPO operating efficiency.

OPTICAL PARAMETRIC OSCILLATOR WITH DELAYED REPUMPING

TECHNICAL FIELD OF THE INVENTION

The present invention relates generally to optical parametric oscillators. It relates in particular to an optical parametric oscillator in which a pump pulse makes two sequential passes through a parametric gain medium for improving efficiency of converting the pump pulse to signal light.

DISCUSSION OF BACKGROUND ART

Optical parametric oscillators (OPOs) are based on the combination of an optically pumped parametric gain medium, which provides optical gain, disposed within an optical resonator cavity. The parametric gain medium is typically an optically nonlinear crystal.

A parametric mixing process in the non-linear crystal provides gain by converting pump light at a frequency $\omega_{pump}$ to light at optical output frequencies $\omega_{signal}$ (signal light) and $\omega_{idler}$, according to the following expression.

$$\omega_{pump} = \omega_{signal} + \omega_{idler} \quad (1)$$

The optical resonator cavity provides feedback of amplified signal light which leads to sustained oscillation or resonating of the signal light, and the production of usable signal light output. The signal light may be defined as laser-like light The frequencies of the signal light and idler beams can be tuned over a wide range by adjusting angular alignment and/or temperature of the non-linear crystal, which affects the indices of refraction. The output frequencies are a function of the indices of refraction. OPOs are thus useful sources of tunable laser-like light.

The parametric gain of a typical nonlinear crystal is typically very weak. It can be defined by an expression:

$$gain = \cosh^2(K(I_{pump})^{0.5}) \quad (2)$$

where K is a constant and $I_{pump}$ is the intensity of pump light in units of Megawatts per centimeter squared (MW/cm$_2$). For a typical configuration with a 10 millimeter (mm) beta barium borate ($\beta$-BaB$_2$O$_4$ or BBO) crystal used as a gain medium, pump light having a wavelength of about 355 nanometers (nm), provides signal light at wavelength of about 500 nm, and K is a constant having a value of about 0.205. Due to the low value of K, high-energy, short-pulse lasers are often used as pump sources for such a crystal. Such lasers can easily produce pulse intensities of >100 MW/cm$^2$. This is sufficient to produce a gain which is sufficient for OPO oscillation.

Such short-pulse lasers typically have pulsewidths on the order of 10 nanoseconds (ns) or less, so that the buildup time for oscillation of signal light is a significant fraction of the pump-light pulse width, as is the resonator cavity round-trip time for the signal light. This effect tends to increase the threshold pump-light fluence from what might be expected from expression (2) above.

Higher effective pumping powers have been achieved in standing-wave OPOs by retroreflecting the pump beam into the gain medium, thereby repumping the gain medium. This repumping occurs in about the same time period as the initial pumping, and increases the effective peak pump power intensity seen by the gain medium for a given real pump power, but does not significantly increase the pump pulse length. This increases round trip gain, but with an increased probability of damage to components, particularly the gain medium, of the OPO by the higher pump pulse intensity.

Brosnan and Byer in a paper "*Optical Parametric Oscillator Threshold and Linewidth Studies*", IEE Journal of Quantum Electronics, Vol QE-15, NO. 6, pp 415-431, (June 1979), have shown that threshold pump fluence scales inversely with pump light pulse width. A means for producing effectively longer pump light pulses without increasing pump pulse intensity in the gain medium would thus have a significant beneficial effect on OPO device pump threshold, and on OPO operating efficiency.

SUMMARY OF THE INVENTION

It is an object of the present invention to provide an optical parametric oscillator which provides for effectively lengthening the pulse duration of an input pump light pulse in a gain medium of the optical parametric oscillator. It is a further object of the invention that this pulse length increase be effected without significantly increasing the intensity of the pump-light pulse in the gain medium.

In one aspect of the present invention, an optical parametric oscillator comprises a resonator cavity for signal light, and a parametric gain medium disposed in the resonant cavity for converting pump light to the signal light. The optical parametric oscillator includes an optical arrangement for directing a pulse of the pump light pulse to make generally longitudinally counterpropagating initial and return passes through the gain medium. The optical arrangement is configured such that the initial and return passes are separated in time by a delay time corresponding to at least about one-half of one full-width at half-maximum intensity (0.5 FWHM) of the pump-light pulse.

When the initial and return passes are separated in time by such an interval, the effect is to stretch the pump pulse in time without a loss of peak power, and thereby reduce the ratio of the cavity round-trip time to the pump pulse duration. A result of this is that temporal overlap between the pump pulse and the OPO oscillation is increased, leading to more efficient operation. An additional result is that signal light in the resonator cavity makes more round trips which is advantageous for line-narrowed OPOs. A line-narrowed OPO is an OPO which includes one or more line-narrowing elements, for example, a diffraction grating, in the laser resonator cavity. A result of more total cavity round trips is that such line narrowing elements become more effective.

In another aspect of the present invention, temporal separation of the initial and return passes is accomplished by an optical delay line arrangement which is configured such that the initial and return passes counterpropagate through about the same volume of the gain medium. This is preferably accomplished by incorporating in the optical delay line an optical relay imaging system which substantially reimages an object plane in the gain medium to an image plane in the gain medium at about unit magnification.

A benefit of the relay imaging system in the present invention is improved ease of alignment. This is important both for causing the initial and return pump pulse passes to overlap in the same volume of the gain medium crystal, and to exactly counterpropagate. The relay imaging system also provides relative immunity to thermal focussing or lensing effects in the gain medium crystal. Thermal lensing effects might otherwise cause the pump pulse to have a smaller spot size on the return pass than on the initial pass. This would provide poor spatial overlap and would probably cause damage to the gain medium crystal. The relay imaging system also greatly reduces or even eliminates the effect of diffraction on the propagation of the pump beam. This diffraction effect is a deleterious effect commonly observed in pulsed, solid-state lasers such as those lasers commonly used as pump sources for OPOs.

An optical parametric oscillator in accordance with the present invention is capable of effectively doubling the length of a pump light pulse while increasing peak pump light intensity in the gain medium by only about twenty percent (20%).

BRIEF DESCRIPTION OF THE DRAWINGS

The accompanying drawings, which are incorporated in and constitute a part of the specification, schematically illustrate a preferred embodiment of the invention and, together with the general description given above and the detailed description of the preferred embodiment given below, serve to explain the principles of the invention.

DETAILED DESCRIPTION OF THE INVENTION

Before proceeding to describe principles and embodiments of a delayed repumped OPO in accordance with the present invention, it is useful to briefly review prior art OPO arrangements which incorporate repumping without a significant delay between initial and return pump-light pulses. It is also useful to bear in mind that, in most general terms, equation (1) states that pump light in the parametric gain medium generates light of two wavelengths. Either of these can be resonated to provide signal light and the other defined as the idler. It is usually, but not necessarily, the shorter of the two wavelengths which is usually selected to be resonated. Throughout this description and appended claims, the term signal light refers to that light wavlength which is selected to be resonated.

Figure 1:
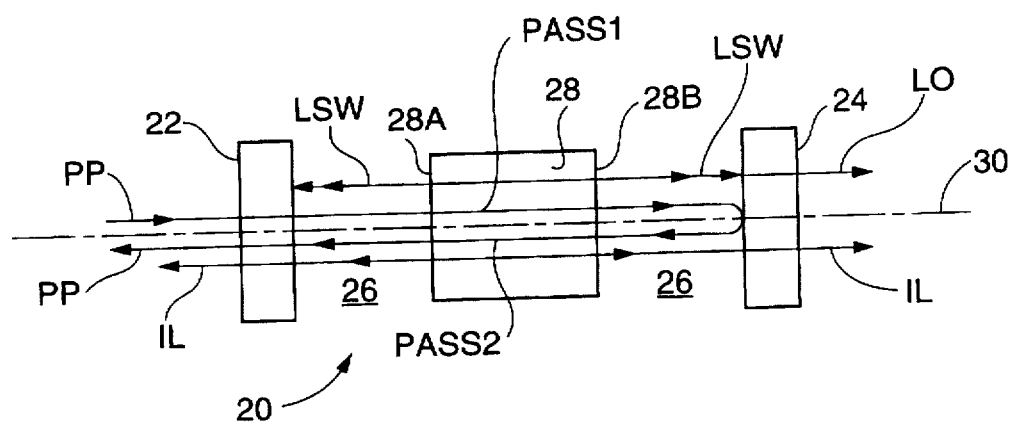
FIG. 1 is a general cross-section view schematically illustrating a prior art OPO arrangement incorporating repumping without significant delay.

A simple prior art OPO arrangement 20 is illustrated in FIG. 1. Here, OPO 20 includes an optical element 22 which has a very high reflectivity for signal light and is highly transparent for both pump light and idler light. An optical element 24 is partially reflective and partially transmissive for pump light, and highly transmissive for idler light. Element 24 may be generally described as an output coupling device. Those familiar with the art to which the present invention pertains will recognize that these reflection and transmission properties may be bestowed on such optical elements by multilayer dielectric interference filter coatings.

Elements 22 and 24 form a resonator cavity 26 for signal light, such that signal light makes repeated round trips (oscillates or resonates) from one element to the other, thereby building up a standing wave which is represented by double-arrowed line LSW. As element 24 is partially transmissive for signal light, a portion of the oscillating signal light escapes from the resonator cavity providing output signal light (LO).

Optical gain for the oscillating signal light is provided by directing a pump beam (pulse) PP through element 22 into cavity 26 and through a gain medium 28 (typically an optically non-linear crystal), entering via face 28A thereof, and exiting via opposite face 28B thereof. Having thus made an initial pass (PASS1) through gain medium 28, the pump pulse is reflected by element 24 and makes a return pass (PASS2) through gain medium 28, entering via face 28B thereof and exiting via opposite face 28A thereof. On each pass of the pump pulse, idler light IL as well as signal light is generated, propagating in the instantaneous direction of propagation of the pulse. This idler light IL escapes cavity 26 through elements 22 and 24.

It should be noted here that pulses PP, LSW, and IL are shown in FIG. 1 and similar illustrations as spatially separate only for convenience of description. Those familiar with the art to which the present invention pertains will recognize that these beams typically propagate, in one longitudinal direction or the other, along about the same path.

It should also be noted, that in the illustration of FIG. 1, and in similar illustrations discussed hereinafter, gain medium 28 is shown as being rectangular and with faces thereof normal to counterpropagating beams. This is only for convenience of description of the delayed repumping principle of the present invention. As discussed above, gain medium crystal faces may be variously inclined to a pump beam as one means of varying signal output wavelength for a particular pump wavelength.

Continuing now with reference to FIG. 1, the initial and return passes (PASS1 and PASS2) of the pump pulse may be described as generally longitudinally counterpropagating with respect to an longitudinal cavity axis 30 extending through elements 22 and 24 and gain medium 28. Typically, the distance between gain medium 28 and reflector 24 is such that PASS1 and PASS2 are separated in time by a delay time less than about one-twentieth of a typical pump-pulse width. Because of this, the pump pulse essentially exactly overlaps itself on the forward and return passes, which increases the effective intensity of the pulse in the gain medium by a factor of about two, this being the intent of this prior art arrangement. Because there is only an insignificant delay, however, pulse width is not significantly increased.

Figure 2:
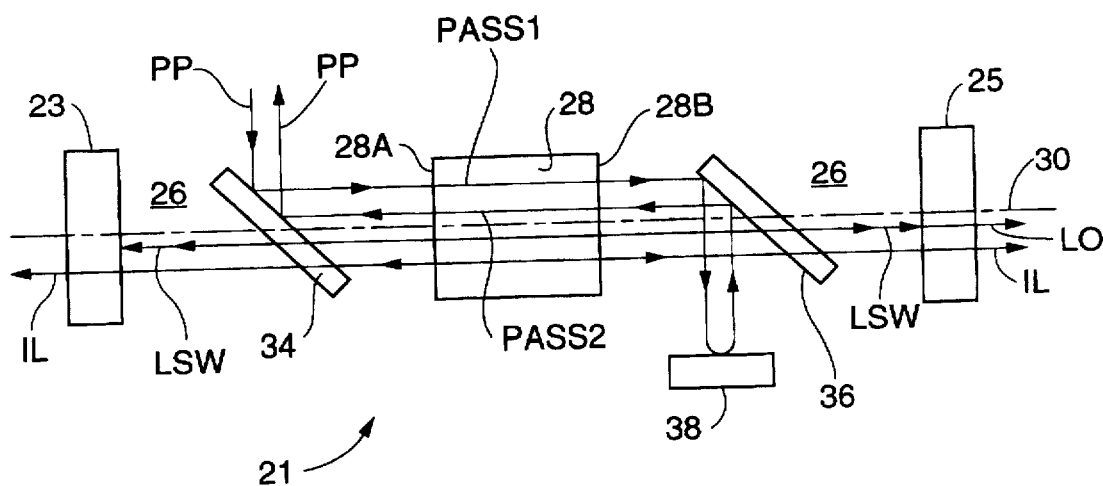
FIG. 2 is a general cross-section view schematically illustrating another prior art OPO arrangement including repumping without significant delay.

Referring now to FIG. 2, another prior art OPO arrangement 21 including repumping without significant delay is illustrated. In OPO 21, signal light resonator cavity 26 is formed by optical elements 23 and 25. Element 25 is highly reflective for signal light and highly transmissive for idler light. Element 25 is partially reflective and partially transmissive for laser light, and highly transmissive for idler light.

A beamsplitter element 34, inclined at an angle to axis 30, directs pump pulse PP, entering resonator cavity 26 transversely to axis 30, generally longitudinally through gain medium 28, as described above. Another beamsplitter element 36 directs the initially passed-through pulse to a return reflector 38 which redirects the initially passed-through pump pulse via, beamsplitter 36, to make a return pass through the gain medium, producing the above-discussed effective pulse intensity increase in the gain medium. Beamsplitter elements 34 and 36, of course, are highly reflective for pump light and highly transmissive for signal light and idler light.

The arrangement of OPO 21 has an advantage, among others, that resonator elements 23 and 25 are less expensive to fabricate, not being required to transmit very high intensity pulses of short wavelength (pump) radiation. It is emphasized, however, that as in OPO 20, the effective temporal superposition of initial and return pump pulses is intentional.

Figure 3:
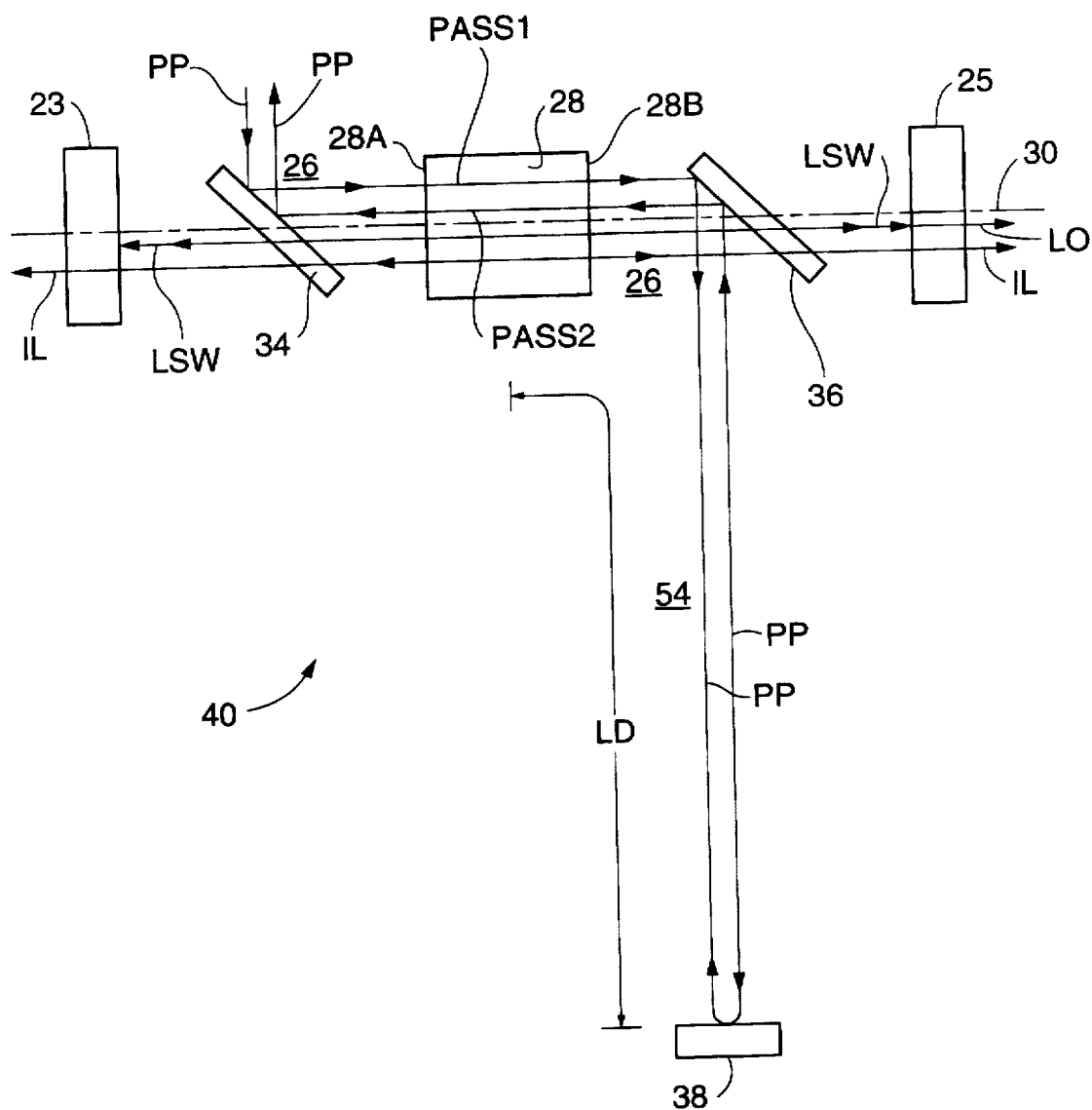
FIG. 3 is a general cross-section view schematically illustrating principles of a delayed repumped OPO in accordance with the presentation, including an optical delay line for delaying return passage of a pump pulse through a gain medium.

Referring now to FIG. 3, a basic embodiment 40 of an OPO in accordance with the present invention is illustrated. Here, optical elements of the OPO are similar to those of above-described prior art OPO 21. A significant difference, however, is that in OPO 40 the separation between pump pulse redirecting reflector 38 and beamsplitter 36 (space 54) is greatly increased compared with OPO 21, such that an optical delay line for delaying return of a pulse initially passed through gain medium 28 is effectively formed. The delay line has a round trip path length of twice the distance LD, which is the sum of the distances separating the gain medium and beamsplitter 36, and beamsplitter 36 and reflector 38. This delay line creates a delay about equal to 2 LD/c (where c is the speed of light in air or vacuum) between initial and return passes of the pump pulse through gain medium 28. As summarized above, this delay is preferably arranged such that the initial and return passes of the pulse are separated in time by about one-half of one FWHM of the pump pulse, or greater.

A usual length range (distance between elements 23 and 25) for cavity 26 is between about five centimeters (5 cm) and 10 cm. By way of example, a distance LD of about 30 cm would provide a delay time of about two nanoseconds (2 ns). One frequently used pump-pulse width is about 3 ns.

Figure 4:
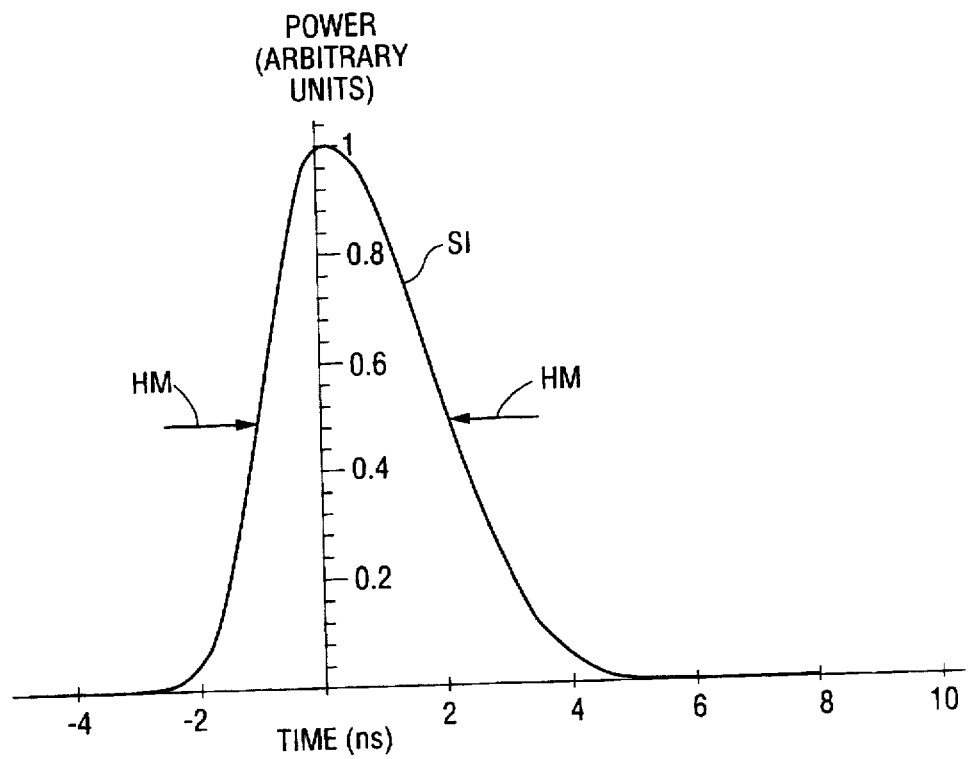
FIG. 4 is a graph schematically illustrating pulse shape and pulse width for a pump pulse in the delayed repumped OPO of FIG. 3.
Figure 5:
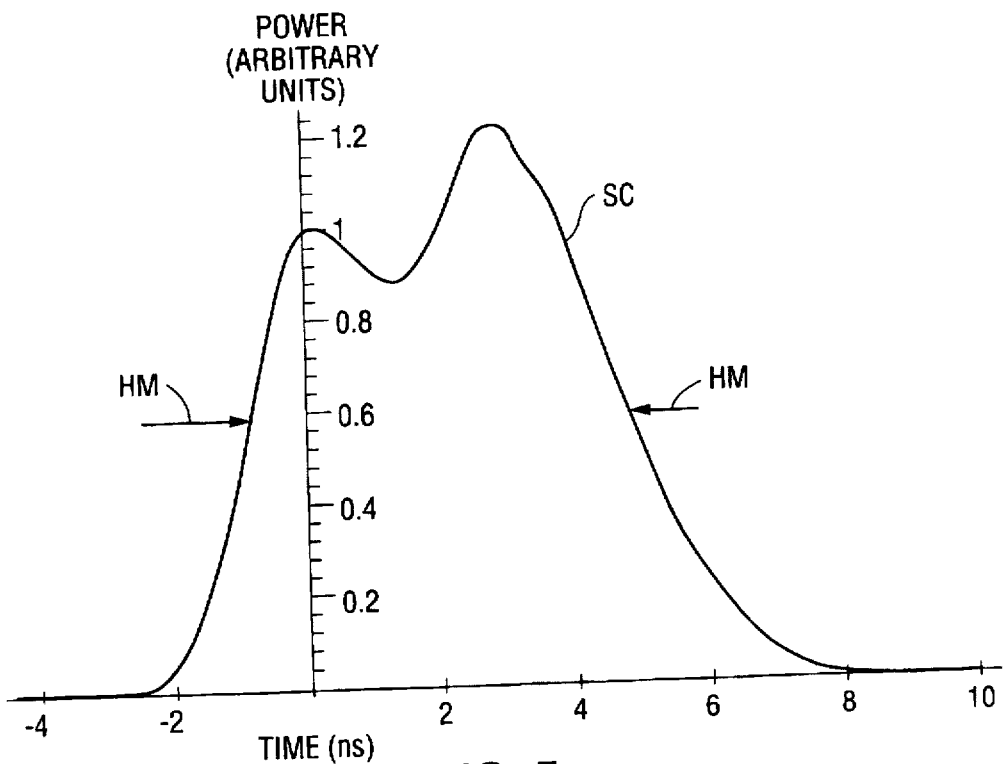
FIG. 5 is a graph schematically illustrating a combination of initial and return passes of the pulse of FIG. 4 through the gain medium of FIG. 3 when the return pass is temporally separated from the initial pass by one FWHM of the pulse.

Continuing now with reference to FIGS. 4 and 5, the effect of delayed passage of a return pulse through gain medium 28 is illustrated. FIG. 4 illustrates the shape (curve SI) of an initial pulse. The shape of this pulse is modelled on the shape of a 355 nm wavelength output pulse from an INFINITY™, Model 40-100 laser, manufactured by the assignee of the present invention. This pulse has a FWHM (measured at a point indicated by arrows HM) of about 3 ns. FIG. 5 illustrates the shape (curve SC) of a combination of initial and return passes of the pulse of FIG. 4 in gain medium 28 (see FIG. 3) when the initial and return passes are temporally separated by one FWHM of pulse SI, i.e., by a delay time of about 3 ns. This delay time corresponds to a length LD (see FIG. 3) of about 45 cm. It can be seen that the combination pulse has a width of about 6 ns, and has a peak power (or intensity) only about twenty percent greater that the initial pulse.

Figure 6:
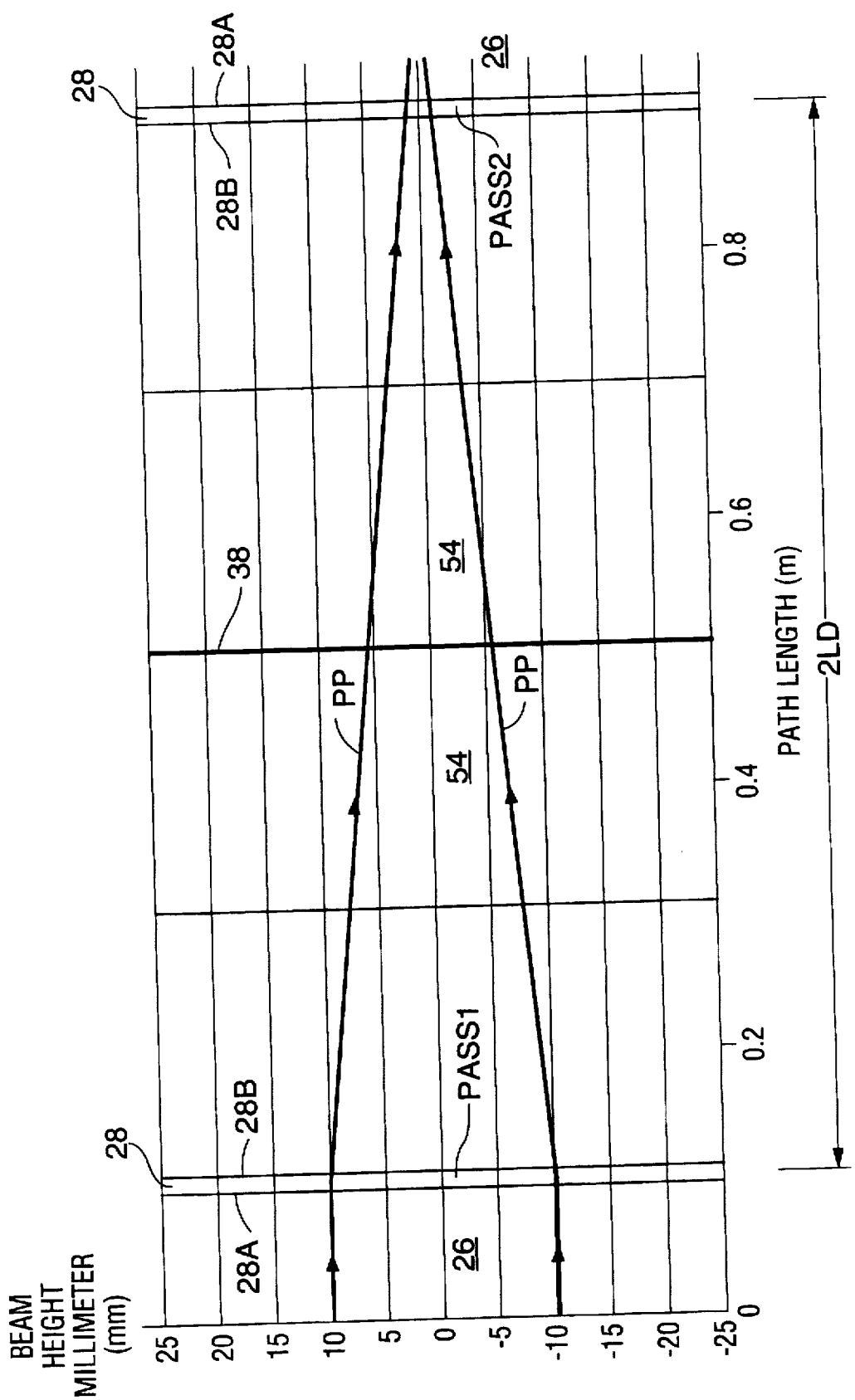
FIG. 6 is a graph schematically illustrating pump beam dimensions and component separation dimensions in a delayed repumped OPO as illustrated in FIG. 3 and wherein the gain medium exhibits thermal lensing.

Referring now to FIG. 6, a potential drawback of the relatively simple delay line arrangement of OPO 40 is discussed. FIG. 6 is in the form of a graph showing the beam diameter (the vertical distance between lines PP) of a pump beam pulse as it propagates through an OPO 40 in which the gain medium (non-linear crystal) exhibits positive thermal lensing. The path of the pulse is shown "unfolded"0 about delay line return reflector 38, which is here assumed to have no optical power. Gain medium 28 is shown at the beginning and end of the pulse path, and is assumed to have a positive power of one diopter due to thermal lensing. Beamsplitter element 36, having zero power, does not influence beam shape, and has been omitted for clarity.

After being initially collimated, in space 26, the beam is converted by thermal lensing in gain medium 28 into a converging beam passing through space 54 between the gain medium 28 and reflector 38. Because of the delay line length, here shown as about 45 cm, corresponding to a round trip of about 90 cm, even a relatively small angular convergence causes a significant reduction of beam diameter on a return pass through the gain medium. Such a beam diameter reduction could lead to an increase in pump pulse intensity in the gain medium sufficient to cause its destruction.

Figure 7:
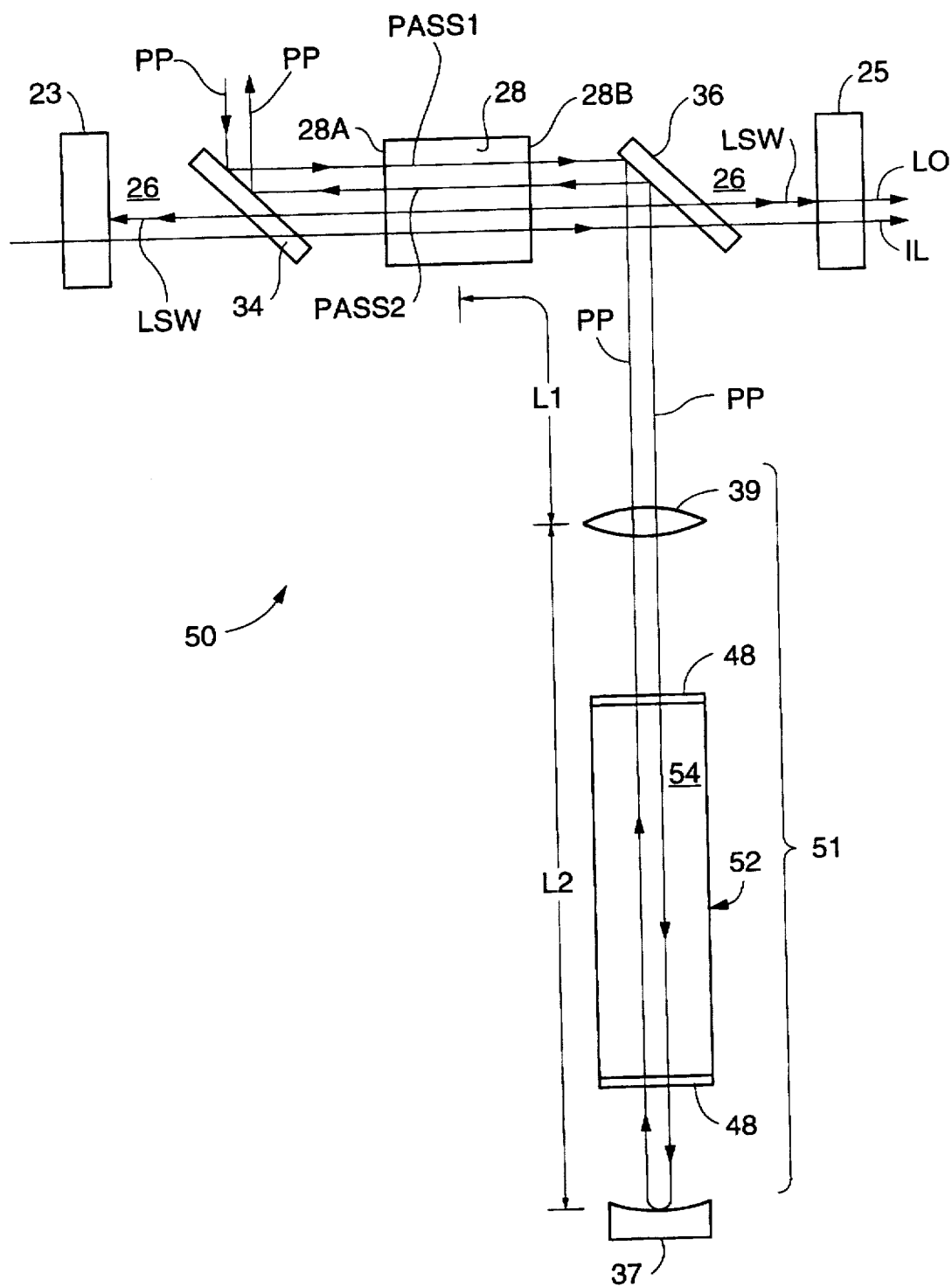
FIG. 7 schematically illustrates a preferred embodiment of a delayed repumped OPO in accordance with the present invention including an optical delay line for delaying return passage of a pump pulse through a gain medium, and wherein the optical delay line includes a relay imaging system.

Referring now to FIG. 7, a preferred embodiment 50 of a delayed repumped OPO in accordance with the present invention is illustrated. OPO 50 includes an optical arrangement for causing initial and return passes of the pump pulse to occur through substantially the same volume of gain medium 28, even under conditions of moderate thermal lensing in the gain medium. This is accomplished in OPO 50 by incorporating a relay imaging system 51 in the return pulse delay path of the OPO. The expression "same volume"0 in the context of this description means the same three dimensional region of the gain medium, rather than the same measured volume elsewhere in the gain medium.

A relay imaging system is generally defined as an optical system that transfers light rays from an object plane to an image plane, preserving both their transverse positions and ray directions, up to an overall magnification factor. Relaying imaging system 51 is formed by a spherical concave surface (positive) reflector 37 and a positive lens 39 between beamsplitter 36 and reflector 37. Lens 39 and reflector 37 both serve to bring the pump pulse beam to an intermediate focus in a space 54 therebetween. Were this space filled with air, pump pulse intensity would cause air breakdown with accompanying plasma or spark. For this reason, a vacuum cell 52, including windows 48 which are highly transparent to pump light, is placed between lens 39 and reflector 37 such that the intermediate focus is in a vacuum.

Relay imaging system 51 preferably has unit magnification. This is achieved by making spacing L2 between reflector 37 and lens 39 equal to about the radius of curvature (R) of reflector plus the focal length of the lens. For a reflector having a spherical radius of curvature the focal length is half of the radius of curvature. Spacing L1, which is the sum of the spacings between gain medium 28 and beamsplitter 36, and between beamsplitter 36 and lens 39 is about twice the focal length of lens 39. Beneficial effects of a relay imaging system are substantially preserved even if these optical specifications are not exactly met.

Figure 8:
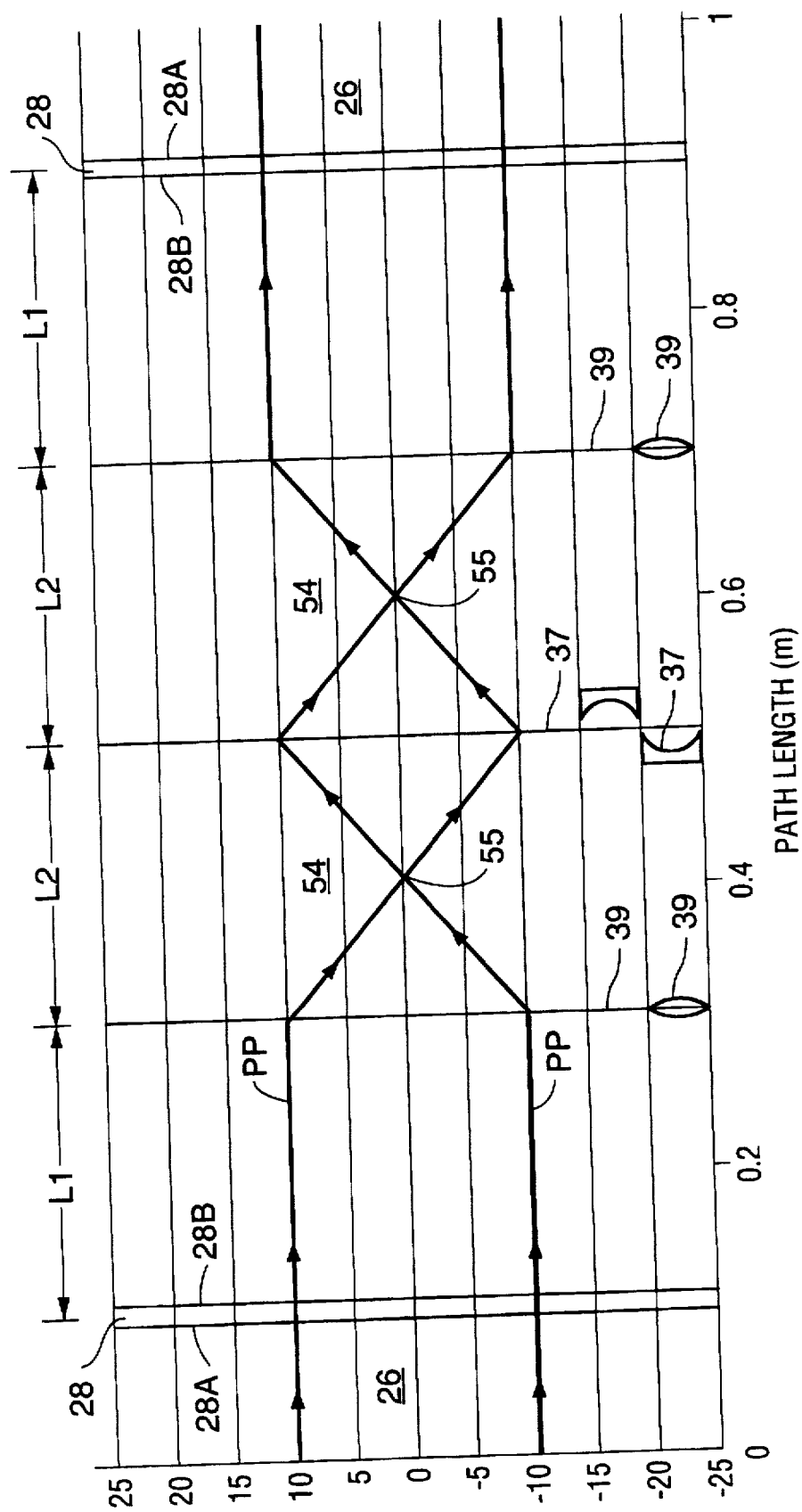
FIG. 8 is a graph schematically illustrating pump-beam dimensions and component separation dimensions in the delayed repumped OPO as illustrated in FIG. 7, and wherein the gain medium does not exhibit thermal lensing.

Beam transport through relay imaging system 51, in the absence of thermal lensing by gain medium 28, is illustrated in FIG. 8. The beam path is shown "unfolded"0 as in FIG. 6. Beamsplitters 34 and 36, and vacuum cell windows 48 preferably have no optical power, and have been omitted from FIG. 8 for clarity.

A collimated beam in space 26 enters gain medium crystal 28 via face 28A thereof and exits via face 28B thereof. In the absence of thermal lensing in the gain medium, the beam remains collimated until it reaches positive lens 39. Lens 39 brings the beam to an intermediate focus 55 in space 54. The beam then expands until it reaches reflector 37 which refocuses the beam back on focal point 55. The beam then expands to meet lens 39 which recollimates the beam. The recollimated beam then proceeds to reenter gain medium 28 via face 28B thereof and exits via face 28A thereof. The reentering beam has the same beam height and traverses the same volume of the gain medium as the initial beam.

Figure 9:
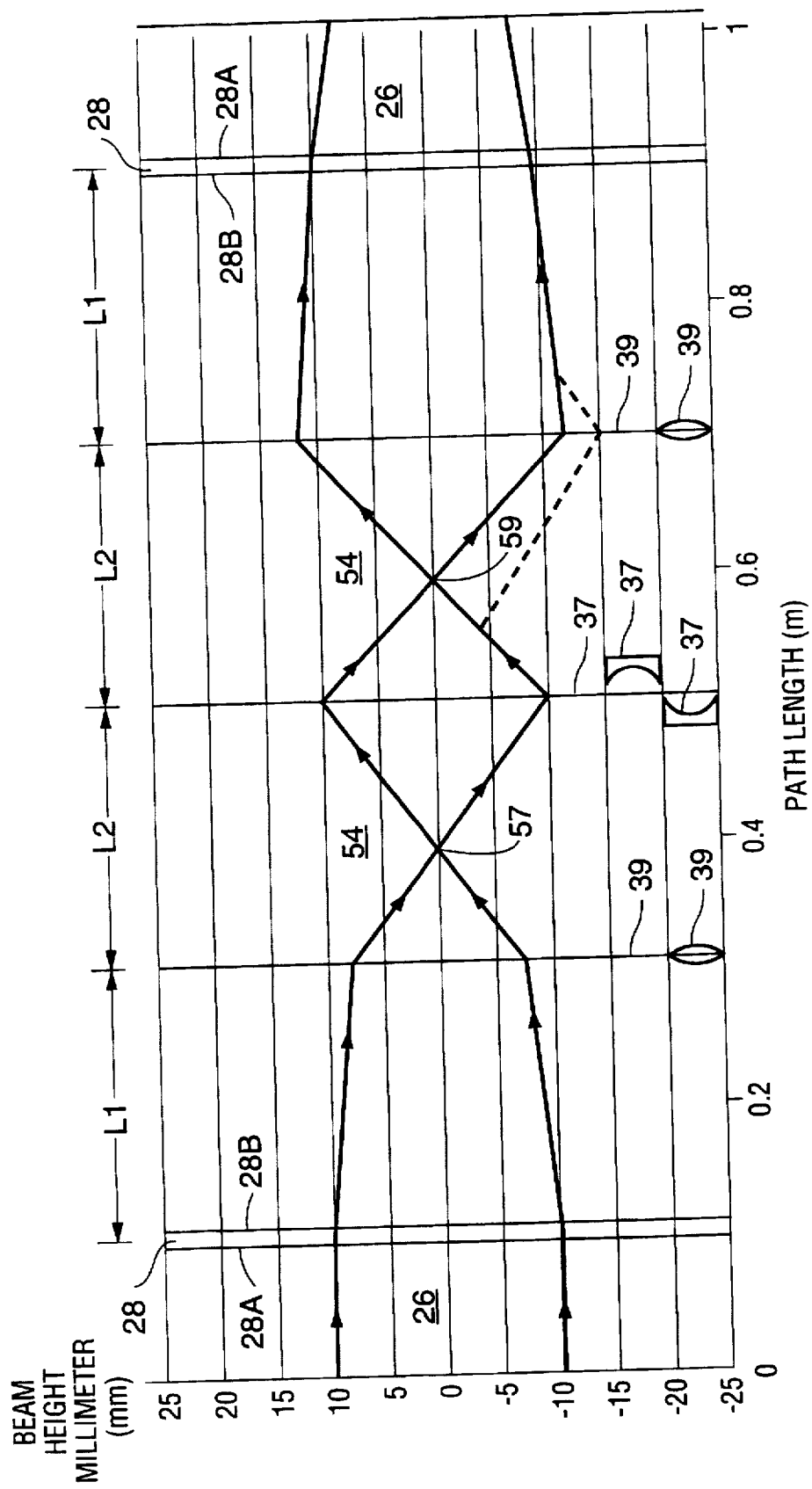
FIG. 9 is a graph schematically illustrating pump-beam dimensions and component separation dimensions in the delayed repumped OPO as illustrated in FIG. 7, and wherein the gain medium exhibits the thermal lensing of FIG. 6.

Continuing now with reference to FIG. 9, the capability of relay imaging system 51 to deal with thermal lensing effects in gain medium 28 is illustrated. The spatial relationship of the gain medium, lens 39, and reflector 37 is the same as in FIG. 7. The focal length of the lens and the reflector curvature radius are assumed to be the same, and power of the gain medium due to thermal lensing is assumed to be the same as illustrated in FIG. 6.

The thermal lensing in the gain medium decollimates the pump pulse beam causing it to converge. Lens 39 brings the converging beam to a focus at point 57 within the focal length of the lens, and without the radius of curvature of the reflector. The reflector then refocuses the beam at a point within the radius of curvature of the reflector and without the focal length of the lens. The beam thus reaches lens 39 on its return path with a height greater than the height of the initial collimated beam. The increased-height beam, however, is converged by lens 39 such that, on the return pass through the gain medium, the beam height is essentially the same as on the initial pass and the return pass beam traverses essentially the same volume of gain medium 28.

Figure 10:
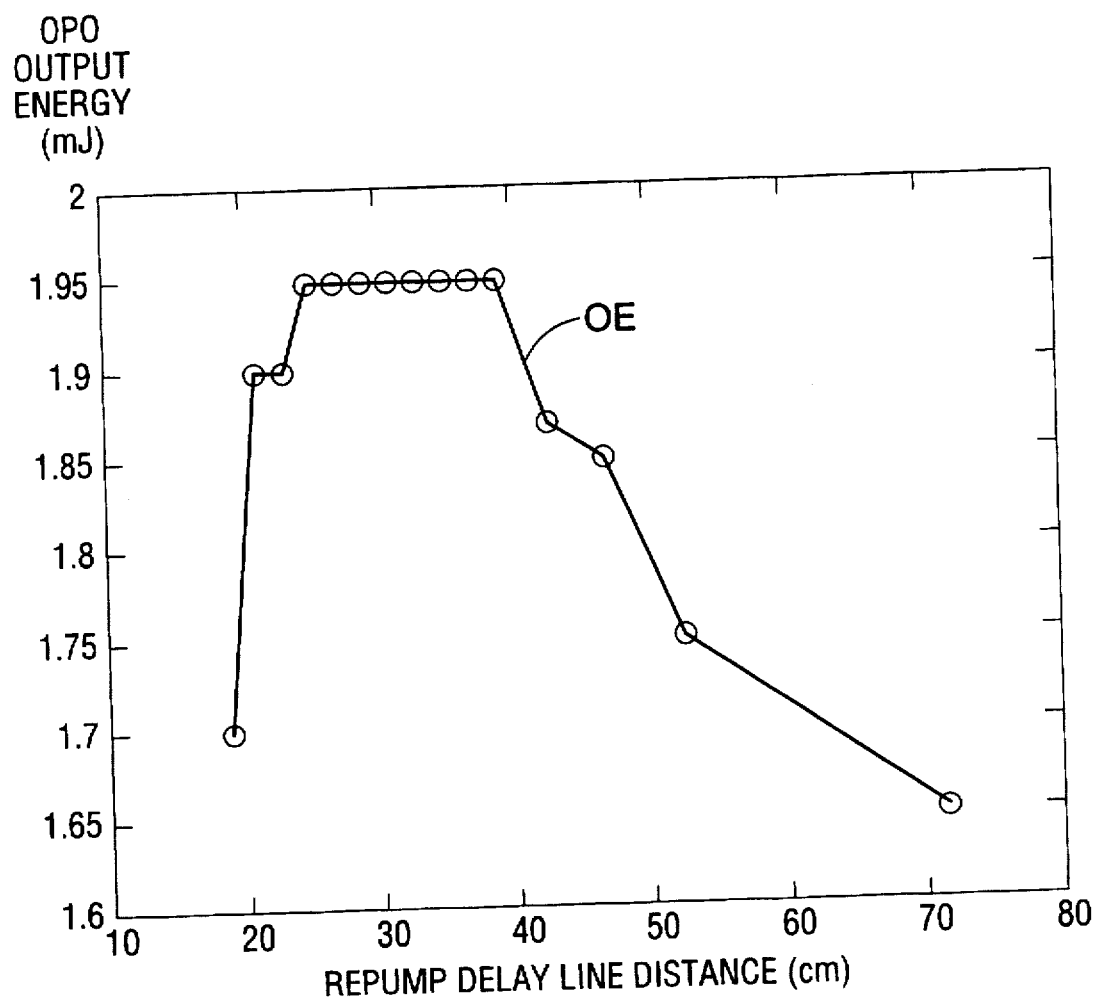
FIG. 10 is a graph schematically illustrating measured output power as a function of repump delay time for a delayed repumped OPO in accordance with the present invention.

Referring now to FIG. 10, an example of the performance of an OPO of the type illustrated in FIG. 7 is described. In FIG. 10 curve OE shows measured output energy as a function of repump delay line distance LD. In the example, a 10 mm BBO crystal was used as the gain medium. Pump wavelength was 355 nm. Pump pulse energy was twenty-seven millijoules (27 mJ), in a pulse having an FWHM of about 2.5 ns. Signal output was at 633 nm wavelength. Notably, this pump pulse energy was below threshold for single pass pumping in a similar gain medium and resonator configuration.

In FIG. 10, a repump (return pass) delay line distance (length) of 30 cm corresponds to a round-trip delay time about 2.5 ns or one FWHM of the pump pulse. The effect of the return pass delay becomes evident at a delay line distance of about 18 cm, which corresponds to a delay slightly greater than about 0.5 FWHM of the pump pulse. Output energy can be seen to be substantially constant for a relatively wide range of delay distances.

While examples of embodiments of the present invention described above have been given in terms of a BBO crystal gain medium and a specific resonator configuration, advantages of delayed repumping in accordance with the present invention can be expected for any parametric gain medium. Type I or Type II. A suitable gain medium may be a material selected from the group consisting of BBO, lithium niobate ($LiNbO_3$), potassium niobate ($KnBO_3$), lithium iodate ($LiIO_3$), potassium titanium phosphate ($KTiOPO_4$ or KTP), lithium borate ($LiB_2O_5$ or LBO), potassium dihydrogen phosphate (KDP) and isomorphs of KDP.

Advantages of delayed repumping in accordance with the present invention can also be expected for any OPO configuration, for example an OPO wherein the resonator cavity includes one or more line elements such as diffraction gratings, a repumped OPO wherein the counterpropagating pump beams counterpropagate along a path at an angle to the cavity axis in at least one plane, or some combination thereof.

Figure 11:
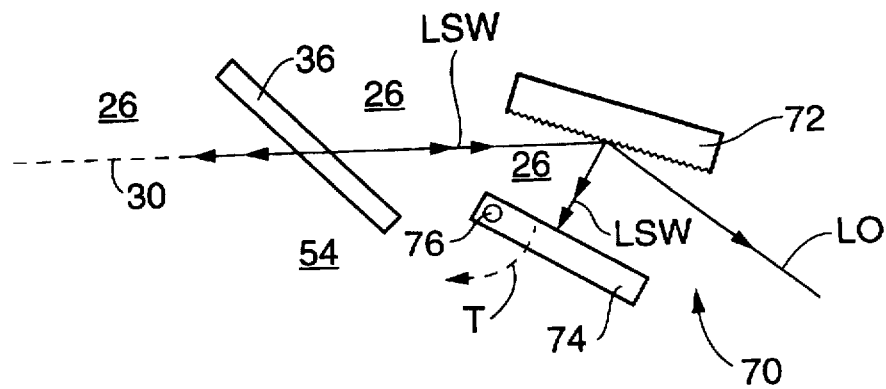
FIG. 11 is a partial elevation view schematically illustrating a combination of a mirror and a grating in a Littman configuration, used as a signal light output coupling device in a delayed repumped OPO in accordance with the present invention.
Figure 12:
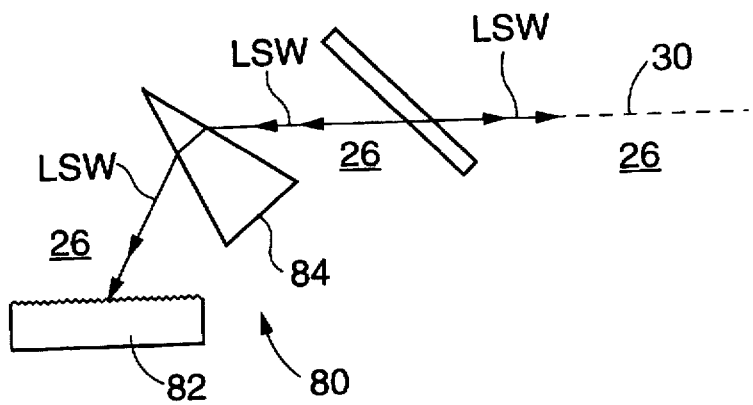
FIG. 12 is a partial elevation view schematically illustrating a combination of a prism and a grating in a Littrow configuration, used as a line narrowing high reflective device for a resonant cavity in a delayed repumped OPO in accordance with the present invention.

By way of example, FIG. 11 illustrates an arrangement 70 of a diffraction grating 72 used in combination with a mirror 74 to tune signal light output of OPO 50 as well as provide line narrowing. Grating 72 is at least partially reflective for signal light. Tuning is provided by tilting mirror 74 about an axis 76 (as illustrated by arrow T). Such a combination is typically used, as an output coupling device in a prior art OPO, and may be used in place of a partially reflective partially transmissive element such as element 24 of OPO 50. Output signal light is transmitted out of cavity 26 by the 0th order reflection of diffraction grating 26. This type of diffraction grating/mirror combination is usually referred to by practitioners of the art as a "Littman"0 configuration or mode of a grating. In FIG. 12, an alternative grating configuration 80 is illustrated. Here, a grating 82 is highly reflective for signal light and is often used in prior art OPOs as a maximum reflective element. It is shown in FIG. 12 as replacing element 22 of OPO 50. Grating 82 may be used alone, but is often used in combination with another (refractive) dispersive element such as a prism 84 as illustrated. A grating arranged as illustrated in FIG. 12 is usually referred to by practitioners of the art as a "Littrow"0 configuration or mode of a grating.

Figure 13:
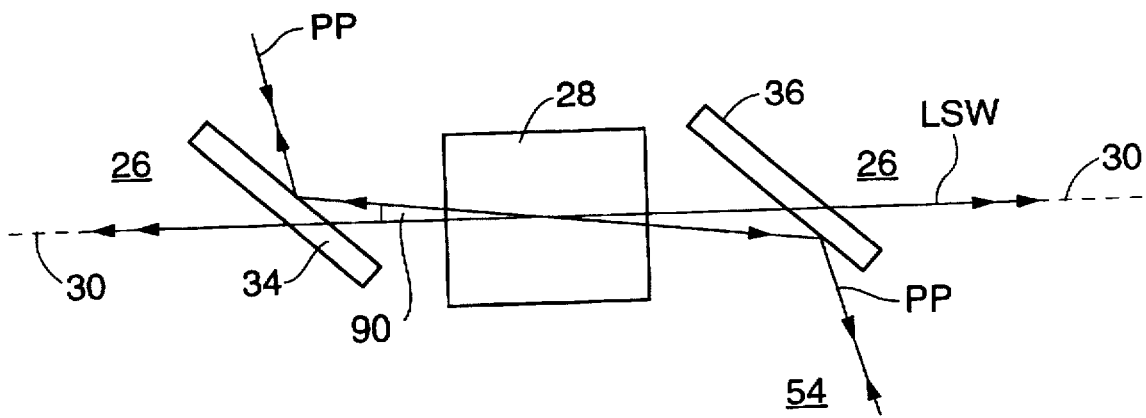
FIG. 13 is a partial elevation view schematically illustrating pump light pulses longitudinally counterpropagating at an angle to a resonant cavity axis in an OPO in accordance with the present invention.

While delayed repumped OPOs in accordance with the present invention have been described with reference to embodiments 40 and 50 wherein initial and return pump beams counterpropagate colinearly with resonating signal light, advantages of delayed repumping can be expected when the initial and return pump pulses propagate along a path which is noncolinear with the resonating signal light in one axis only or in two mutually perpendicular axes. Such a noncolinear pumping scheme is often used in prior art OPOs to provide a narrower divergence and smaller bandwidth for output signal light than would be characteristic of a colinear pumped OPO. Such an arrangement is illustrated in FIG. 13, wherein pump beams PP propagate through gain medium 28 at an angle 90 to longitudinal axis 30 of cavity 26 of OPO 50. Beam PP may also propagate at an angle to axis 30 in a plane perpendicular to the plane of the illustration. Typically the pump light is not inclined to longitudinal axis 30 (in any plane) by more than about five degrees. Because of this the initial and return pump beams can still be defined as generally longitudinally counterpropagating through gain medium 28.

Above-described optical arrangements for providing return pass or repump delay should also be considered as non-limiting examples of such arrangements. Those skilled in the optical design art will doubtless conceive of other delay or reimaging optical systems without departing from the spirit and scope of the present invention. Such systems may include, for example, means such as prisms or turning mirrors for folding the delay line path to reduce overall dimensions of a delayed repumped OPO in accordance with the present invention.

The present invention has been described and depicted in terms of a preferred and other embodiments. The invention is not limited, however, by the embodiments described and depicted. Rather, the invention is limited by the claims appended hereto.

What is claimed is:

1. An optical parametric oscillator, comprising:
   a resonant cavity for signal light, and disposed in said resonant cavity an optically non-linear crystal for converting pump light to said signal light; and
   means for directing a pulse of said pump light to make first and second generally longitudinally counterpropagating passes through said gain medium, said first and second passes separated in time by a delay time corresponding to at least about one-half of one full-width at half-maximum power of said pump-light pulse.

2. The optical parametric oscillator of claim 1 wherein said parametric gain medium is a material selected from the group consisting of beta barium borate, lithium niobate, potassium niobate, lithium iodate, potassium titanium phosphate, lithium borate, and potassium dihydrogen phosphate, and isomorphs of potassium dihydrogen phosphate.

3. The optical parametric oscillator of claim 1 wherein said counterpropagating passes pass through about the same volume of said gain medium.

4. The optical parametric oscillator of claim 1, wherein said resonant cavity has a cavity axis, said signal light resonates along said resonator axis, and said pump light makes said counterpropagating passes at an angle to said cavity axis.

5. The optical parametric oscillator of claim 1, wherein said resonant cavity is terminated at one end thereof by an optical device highly reflective for said signal light, and at an opposite end thereof by an output coupling device including a combination of a mirror and a reflective diffraction grating in a Littman configuration.

6. The optical parametric oscillator of claim 1, wherein said resonant cavity is terminated at one end thereof by an optical device partially reflective for said signal light and partially transmissive for said signal light, and at an opposite end thereof by a diffraction grating in a Littrow configuration.

7. An optical parametric oscillator, comprising:
   a resonant cavity for signal light, and an optically non-linear crystal disposed in said resonant cavity for converting pump light to said signal light;
   means for directing a pulse of said pump light to make generally longitudinally counterpropagating initial and return passes through said gain medium; and
   said directing means arranged such that said initial pass and said return pass are separated in time by a delay time corresponding to at least about one-half of one full-width at half-maximum power of said pump-light pulse.

8. The apparatus of claim 7, wherein said pump-light pulse during said initial pass has a first beam dimension within said gain medium, and during said return pass has a second beam dimension within said gain medium, and said directing means includes a plurality of optical elements arranged such that said first and second beam dimensions are about equal.

9. The optical parametric oscillator of claim 8, wherein said plurality of optical elements forms a relay imaging system.

10. The optical parametric oscillator of claim 7, wherein said initial and return passes of said pump-light pulses propagate through about the same volume of said gain medium.

11. The optical parametric oscillator of claim 10, wherein said gain medium is a material selected from the group consisting of beta barium borate, lithium niobate, potassium niobate, lithium iodate, potassium titanium phosphate, lithium borate, and potassium dihydrogen phosphate, and isomorphs of potassium dihydrogen phosphate.

12. An optical parametric oscillator, comprising:
   a resonant cavity for signal light, and an optically non-linear crystal disposed in said resonant cavity for converting pump light to said signal light; and
   means for directing a pulse of said pump light to make first and second longitudinally counterpropagating passes through about the same volume of said gain medium, said first and second passes separated in time by a delay time corresponding to at least about one-half of one full-width at half-maximum power of said pump-light pulse.

13. The optical parametric oscillator of claim 12, wherein said gain medium is a material selected from the group consisting of beta barium borate, lithium niobate, potassium niobate, lithium iodate, potassium titanium phosphate, lithium borate, and potassium dihydrogen phosphate, and isomorphs of potassium dihydrogen phosphate.

14. The optical parametric oscillator of claim 12, wherein said resonant cavity has a cavity axis, said signal light resonates along said resonator axis, and said pump light makes said counterpropagating passes at an angle to said cavity axis.

15. The optical parametric oscillator of claim 12, wherein said resonant cavity is terminated at one end thereof by an optical device highly reflective for said signal light and at an opposite end thereof by an output coupling device including a combination of a mirror and a reflective diffraction grating in a Littman configuration.

16. The optical parametric oscillator of claim 12, wherein said resonant cavity is terminated at one end thereof by an optical device partially reflective for said signal light and partially transmissive for said signal light, and at an opposite end thereof by a diffraction grating arranged in a Littrow configuration.

17. A optical parametric oscillator, comprising:
   first and second spaced-apart optical-elements forming a resonant cavity for signal light, and, disposed in said resonant cavity, an optically non-linear crystal for converting pump light to said signal light;
   a beamsplitter located between said crystal and one of said first and second optical elements, said beamsplitter being highly reflective for said pump light and highly transmissive for said signal light;
   a positive reflector located outside of said resonant cavity, said positive reflector being highly reflective for said pump light;
   a positive lens located between said beamsplitter and said positive reflector, said positive lens being highly transmissive for said pump light;
   said beamsplitter, said positive lens, and said positive reflector arranged such that a pulse of said pump light, directed longitudinally on an initial pass through said crystal toward said beamsplitter, is directed transversely out of said resonant cavity, through said positive lens toward said positive reflector, reflected by said positive reflector through said positive lens toward said beamsplitter, and redirected by said beamsplitter to make a return pass longitudinally through said crystal, in a direction opposite that of said initial pass;

said crystal and said beamsplitter, and said beamsplitter and said positive reflector having a combined spacing therebetween such that said initial and return passes of said pulse are separated in time by a delay time corresponding to at least about one-half of one full-width at half peak intensity of said pulse.

18. The optical parametric oscillator of claim 17, wherein said crystal and said beamsplitter, and said beamsplitter and said positive lens have a combined spacing therebetween about equal to twice the focal length of the positive lens, and said positive lens and said positive reflector have a spacing therebetween about equal the focal length of the positive reflector plus twice the focal length of the positive reflector.

19. The optical parametric oscillator of claim 18, further including a vacuum cell located in the path of said pulse between said positive lens and said positive reflector.

20. The optical parametric oscillator of claim 19, wherein said resonant cavity has a cavity axis, said signal light resonates along said resonator axis, and said pump light makes said counterpropagating passes at an angle to said cavity axis.

21. A method of optically pumping an optical parametric oscillator, the optical parametric oscillator including a resonant cavity for signal light and a optically non-linear crystal disposed in the resonant cavity for converting pump light into the signal light, the method comprising the steps of:

(a) directing a pulse of said pump light to make an initial pass longitudinally through the gain medium along a pump light path;

(b) redirecting said initially-passed pump-light pulse to make a return pass through the gain medium along the pump light path in an opposite direction to the direction of said initial pass; and (c) delaying said return pass by a delay time corresponding to greater than about one-half of one full-width at half maximum power of said pump-light pulse.

\* \* \* \* \*